United States Patent
Seo et al.

(10) Patent No.: US 12,542,277 B2
(45) Date of Patent: Feb. 3, 2026

(54) CATHODE ACTIVE MATERIAL, METHOD FOR PREPARING SAME, AND SECONDARY BATTERY INCLUDING CATHODE COMPRISING SAME

(71) Applicant: SM LAB CO., LTD., Ulsan (KR)

(72) Inventors: Min Ho Seo, Gyeonggi-do (KR); Ji Young Kim, Ulsan (KR)

(73) Assignee: SM LAB CO., LTD., Ulsan (KR)

( * ) Notice: Subject to any disclaimer, the term of this patent is extended or adjusted under 35 U.S.C. 154(b) by 918 days.

(21) Appl. No.: 17/425,515

(22) PCT Filed: Dec. 27, 2019

(86) PCT No.: PCT/KR2019/018587
§ 371 (c)(1),
(2) Date: Jul. 23, 2021

(87) PCT Pub. No.: WO2020/175781
PCT Pub. Date: Sep. 3, 2020

(65) Prior Publication Data
US 2022/0102715 A1    Mar. 31, 2022

(30) Foreign Application Priority Data

Feb. 28, 2019 (KR) .................. 10-2019-0024389
Dec. 27, 2019 (KR) .................. 10-2019-0176118

(51) Int. Cl.
*H01M 4/485* (2010.01)
*H01M 4/02* (2006.01)
(Continued)

(52) U.S. Cl.
CPC .......... *H01M 4/485* (2013.01); *H01M 4/366* (2013.01); *H01M 10/0525* (2013.01); *H01M 2004/021* (2013.01)

(58) Field of Classification Search
CPC .. H01M 4/485; H01M 4/366; H01M 10/0525; H01M 2004/021; H01M 4/505; H01M 4/525; Y02E 60/10
See application file for complete search history.

(56) References Cited

U.S. PATENT DOCUMENTS 7,998,620 B2    8/2011  Nanno
2009/0123839 A1*  5/2009  Soma .................. H01M 4/622
                                                    429/231.95
(Continued)

FOREIGN PATENT DOCUMENTS

CN    108598447 A    9/2018
EP    2 541 653 A1   1/2013
(Continued)

OTHER PUBLICATIONS

English language Abstract of KR 1020100060362A.
(Continued)

*Primary Examiner* — Helen Oi K Conley
(74) *Attorney, Agent, or Firm* — William J. Barber; WARE FRESSOLA MAGUIRE & BARBER LLP

(57) ABSTRACT

The present disclosure relates to a cathode active material, a method of preparing the same, and a lithium secondary battery including a cathode including the cathode active material, the cathode active material including: a transition metal (M) other than a Co element, includes at least one element of W, Mg and Ti, and further includes an S element, a preparation method thereof, and a lithium secondary battery including a cathode including the cathode active material.

11 Claims, 9 Drawing Sheets

(51) Int. Cl.
*H01M 4/36* (2006.01)
*H01M 10/0525* (2010.01)

(56) References Cited

U.S. PATENT DOCUMENTS

| | | | |
|---|---|---|---|
| 2013/0032753 A1 | 2/2013 | Yamamato et al. | |
| 2018/0151865 A1 | 5/2018 | Song et al. | |

FOREIGN PATENT DOCUMENTS

| | | |
|---|---|---|
| JP | H08250119 A | 9/1996 |
| JP | 2004172108 A | 6/2004 |
| JP | 2006-054159 A | 2/2006 |
| JP | 2008152923 A | 7/2008 |
| JP | 2011198759 A | 10/2011 |
| JP | 2017-050217 A | 3/2017 |
| KR | 10-2003-0047456 A | 6/2003 |
| KR | 10-2010-0060362 A | 6/2010 |
| WO | 2018/084525 A1 | 5/2018 |

OTHER PUBLICATIONS

English language Abstract of KR 1020030047456A.
English language Abstract of WO 2018084525A1.
English language Abstract of CN 108598447A.
English language Abstract of JP 2017050217A.
English language Abstract of JP 2006054159A.
English language Abstract of JP2011198759A.
English language Abstract of JP2004172108A.
English language Abstract of JP2008152923A.
English language Abstract of JPH08250119A.

* cited by examiner

CATHODE ACTIVE MATERIAL, METHOD FOR PREPARING SAME, AND SECONDARY BATTERY INCLUDING CATHODE COMPRISING SAME

TECHNICAL FIELD

The present disclosure relates to a novel cathode active material, a cathode including the same, and a lithium secondary battery including the cathode.

The present disclosure has been made with funding from the Ministry of Trade, Industry and Energy under assignment identification number P0009541, titled "Development of high strength/long life/high stability Ni-rich NCA (>210 mAh/g, @4.3V) cathode material for medium-size and large-size lithium secondary batteries".

BACKGROUND ART

After lithium secondary batteries were commercialized by Sony Corporation in 1991, demand for lithium secondary batteries has been increasing rapidly in various fields ranging from small home appliances such as mobile IT products to medium-to-large-size electric vehicles and energy storage systems. In particular, low-cost and high-energy cathode materials are essential for medium-to-large-size electric vehicles and energy storage systems. However, cobalt, which is a main raw material of currently commercially available single-crystal $LiCoO_2$ (LCO), is expensive.

Recently, in order to maximize capacity while lowering manufacturing costs, a high-nickel-based cathode active material containing Ni at a molar ratio of 50 mol % or more has been attracting considerable attention. Such a Ni-based cathode active material is prepared by mixing a transition metal compound precursor synthesized by a coprecipitation method with a lithium source and then synthesizing the mixture in a solid phase. However, the Ni-based cathode material synthesized in this way exists in the form of secondary particles in which small primary particles are aggregated, and thus there is a problem in that micro-cracks occur inside the secondary particles during a long-term charging/discharging process. Micro-cracks cause a side reaction between a new interface of a cathode active material and an electrolyte, and as a result, deterioration of battery performance, such as degradation of stability due to gas generation and degradation of battery performance due to depletion of an electrolyte, is induced. In addition, an increase in electrode density (>3.6 g/cc) is required to realize high energy density, which causes the collapse of secondary particles to cause electrolyte depletion due to a side reaction with the electrolyte, thereby leading to a rapid decrease in initial lifetime. Consequently, it means that the Ni-based cathode active material in the form of secondary particles synthesized by a conventional coprecipitation method cannot realize high energy density.

In order to solve the problems of the above-described secondary-particle-type Ni-based cathode active material, research on single-crystal-type Ni-based cathode active materials has recently been conducted. A single-crystal-type Ni-based cathode active material can realize excellent electrochemical performance because particle collapse does not occur even at an electrode density of more than 3.6 g/cc. However, such a single-crystal-type Ni-based cathode active material has a problem in that battery stability is deteriorated due to structural and/or thermal instability caused by unstable $Ni^{3+}$ and $Ni^{4+}$ ions during electrochemical evaluation. Accordingly, in order to develop a high-energy lithium secondary battery, there is still a need for a technology for stabilizing unstable Ni ions in a single-crystal-type Ni-based cathode active material.

Meanwhile, in recent years, as the price of cobalt increases, the price of cathode active materials is increasing. Thus, research is being conducted for the development of a low-cost cathode active material that does not contain a cobalt element, but there is a problem in that phase stability is deteriorated when the cobalt element is not included.

Therefore, there is considerable demand for the development of a cathode active material having high energy density and high electrode density while not containing a cobalt element.

DESCRIPTION OF EMBODIMENTS

Technical Problem

Provided is a cathode active material with improved high energy density and long lifetime characteristics, in which unstable Ni ions are stabilized even when the above-described single crystal type Ni-based cathode active material does not contain Co ions.

Solution to Problem

According to an aspect, there is provided a cathode active material including: a lithium transition metal oxide in which a part of Li is substituted with Na, and which includes a transition metal (M) other than a Co element, includes at least one element of W, Mg and Ti, and further includes an S element.

According to another aspect, there is provided a method of preparing a cathode active material, the method including: preparing a precursor compound in which a part of Li is substituted with Na and which includes a transition metal (M) other than a Co element, includes at least one element of W, Mg and Ti, and further includes an S element; and heat-treating the precursor compound to obtain a cathode active material.

According to another aspect, there is provided a lithium secondary battery including: a cathode including the above-described cathode active material; an anode; and an electrolyte.

Advantageous Effects of Disclosure

In the cathode active material according to an aspect, even when Co is not included, a part of Li is substituted with a Na element, a transition metal (M) other than a Co element is included, and at least one element of W, Mg, and Ti is included, so that unstable Ni cations existing in the cathode active material are stabilized, and a crystal structure is stabilized, thereby allowing a lithium secondary battery including the cathode active material to have high energy density and long lifetime characteristics.

REFERENCE NUMERALS

Figure 1A:
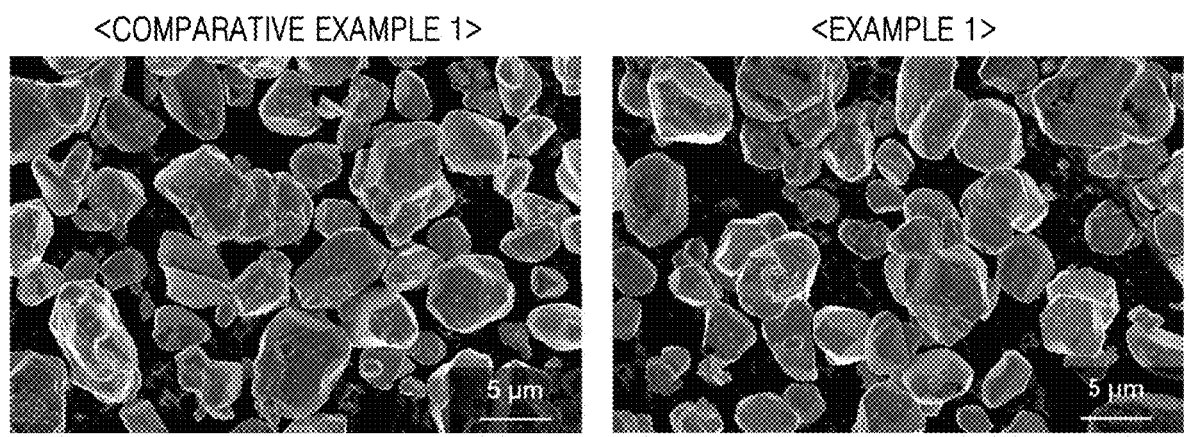
FIG. 1A is an SEM photograph of the cathode active materials of Example 1 and Comparative Example 1.

1: lithium secondary battery
2: anode
3: cathode
4: separator
5: battery case
6: cap assembly

MODE OF DISCLOSURE

The present inventive concept will now be described more fully with reference to the accompanying drawings, in which example embodiments are illustrated. However, the present inventive concept may be embodied in many different forms, should not be construed as being limited to the embodiments set forth herein, and should be construed as including all modifications, equivalents, and alternatives within the scope of the present inventive concept.

The terms used herein is for the purpose of describing particular embodiments only and is not intended to be limiting of the inventive concept. Singular expressions include plural expressions unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the slash "/" or the term "and/or" includes any and all combinations of one or more of the associated listed items.

In the drawings, the thickness is enlarged or reduced in order to clearly express various layers and regions. Throughout the specification, the same reference numerals are attached to similar parts Throughout the specification, when an element such as a layer, a film, a region or a component is referred to as being "on" another layer or element, it can be "directly on" the other layer or element, or intervening layers, regions, or components may also be present. Although the terms "first", "second", "third", etc., may be used herein to describe various elements, components, regions, and/or layers, these elements, components, regions, and/or layers should not be limited by these terms. These terms are used only to distinguish one component from another, not for purposes of limitation.

Hereinafter, a cathode active material according to an embodiment, a preparation method thereof, and a lithium secondary battery including a cathode including the cathode active material will be described in detail.

A cathode active material according to an aspect of an embodiment may include a lithium transition metal oxide in which a part of Li is substituted with Na, and which includes a transition metal (M) other than a Co element, includes at least one element of W, Mg and Ti, and further includes an S element.

Generally, a layered single crystal cathode active material contains Co in a cathode active material composition in order to maintain structural stability during a charging and discharging process. However, due to the high price of Co, when the content of Co is increased for structural stability, the manufacturing cost thereof increases significantly, thereby making industrial application difficult. Accordingly, research on high-capacity cathode active materials that do not contain Co is continuing, but there is a limitation in which the irreversible capacity due to switching during charging and discharging significantly increases.

The inventor of the present disclosure has produced a cathode active material having structural stability as well as suppressing the occurrence of an irreversible phase even during charging and discharging by substituting a part of Li of a high-nickel-based lithium transition metal oxide with Na, substituting a transition metal (M) other than Co with at least one element of W, Mg and Ti, and substituting a part of oxygen with S element in spite of containing no Co. Generally, in the case of the high-nickel-based lithium transition metal oxide, in the absence of Co, the cathode active material deteriorates due to a side reaction with an electrolyte due to unstable Ni(III) and Ni(IV) ions, and thus the lifetime characteristics due to structural deformation deteriorate. However, the inventor of the present disclosure found that one or more elements of W, Mg, and Ti, preferably W, Mg, and Ti elements, were introduced into the cathode active material crystal instead of Co to reduce unstable nickel ions and to achieve structural stabilization. In addition, when Na is substituted in a lattice space where Li is located, the expansion of a crystal structure due to a repulsive force between oxygen atoms in the lithium transition metal oxide is suppressed when lithium is desorbed in a charged state by the intervention of Na, which has an ionic radius larger than that of lithium, and as a result, the structural stability of the lithium transition metal oxide is achieved even during repeated charging. Further, since a bonding force between S and a transition metal is increased by substituting a part of O with S, the transition of the crystal structure of the lithium transition metal oxide is suppressed, and as a result, the structural stability of the lithium transition metal oxide is improved. Since Na is introduced into the lattice space of Li and S is introduced into the lattice space of O, not only a bonding force with a transition metal may be increased, but also a repulsive force between oxygen atoms in a charged state may be reduced, so the structural stability of the lithium transition metal oxide is improved.

According to an embodiment, the lithium transition metal oxide may be represented by Formula 1:

$$Li_xNa_{1-x}M_yM'_zO_{2-t}S_t$$ [Formula 1]

wherein, in Formula 1,

M includes at least one element selected from elements of Groups 3 to 12 of the periodic table, other than Co, W, Mg and Ti;

M' includes at least one element selected from W, Mg and Ti; and $0<x\leq0.01$, $0<y<1$, $0<z<1$, and $0<t\leq0.01$.

According to an embodiment, y and z may satisfy $0<z$ $(y+z)\leq0.02$. Here, z refers to a molar ratio of at least one element selected from W, Mg, and Ti. Accordingly, among the transition metals of the lithium transition metal oxide, the molar ratio of at least one element selected from W, Mg, and Ti may be more than 0 and 0.02 or less.

For example, y and z may satisfy $0<z(y+z)\leq0.016$.

According to an embodiment, the lithium transition metal oxide may be represented by Formula 2:

$$Li_xNa_{1-x}M_{1-(\alpha+\beta+\gamma)}W_\alpha Mg_\beta Ti_\gamma O_{2-t}S_t \qquad \text{[Formula 2]}$$

wherein, in Formula 2,

M includes at least one element selected from Sc, Y, Zr, Hf, V, Nb, Ta, Cr, Mo, Mn, Tc, Re, Fe, Ru, Os, Rh, Ir, Ni, Pd, Pt, Cu, Ag, Au, Zn, Cd and Hg; and $0<x\leq0.01$, $0<\alpha\leq0.01$, $0<\beta\leq0.005$, $0<\gamma\leq0.005$, $0<t\leq0.01$, and $0<\alpha+\beta+\gamma\leq0.02$.

According to an embodiment, in Formula 2, M includes at least one element selected from Ni, Mn, Al, V, Ca, Zr, B, and P.

For example, in Formula 2, M includes at least one element selected from Ni, Mn, Al, Zr, and P.

According to an embodiment, x may satisfy $0<x\leq0.01$. Here, x refers to a substitution molar ratio of Na to Li in the lithium transition metal oxide represented by Formula 1. In the lithium transition metal oxide represented by Formula 1, a part of Li is substituted with Na, and thus the structural stability of the lithium transition metal oxide may be improved. When Na is substituted in a lattice space where Li is located, the expansion of a crystal structure due to a repulsive force between oxygen atoms in the lithium transition metal oxide is suppressed when lithium is desorbed in a charged state by the intervention of Na, which has an ionic radius larger than that of lithium, and as a result, the structural stability of the lithium transition metal oxide is achieved even during repeated charging.

According to an embodiment, $\alpha$ may satisfy $0<\alpha\leq0.01$. Here, $\alpha$ refers to a substitution molar ratio of W to M element in the lithium transition metal oxide represented by Formula 1. When W is substituted in the above range, the structural stability of the lithium transition metal oxide is improved. When the substitution molar ratio of W is more than 0.01, structural stability may be deteriorated due to distortion of the crystal structure, and $WO_3$ may be formed as an impurity, thereby causing deterioration of electrochemical characteristics.

According to an embodiment, $\beta$ may satisfy $0<\beta\leq0.005$. Here, $\beta$ refers to a substitution molar ratio of Mg to M element in the lithium transition metal oxide represented by Formula 1. When the substitution molar ratio of Mg satisfies the above range, structural expansion of the lithium transition metal oxide in a charged state may be suppressed.

According to an embodiment, $\gamma$ may satisfy $0<\gamma\leq0.005$. Here, $\gamma$ refers to a substitution molar ratio of Ti to M element in the lithium transition metal oxide represented by Formula 1. When the substitution molar ratio of Ti satisfies the above range, structural expansion of the lithium transition metal oxide in a charged state may be suppressed.

When the lithium transition metal oxide is substituted with W, Mg, and Ti in the above molar ratios, even when lithium is desorbed in the charged state, the structural expansion of crystal due to the interaction between oxygen atoms in the lithium transition metal oxide is suppressed, thereby improving structural stability to improve lifetime characteristics.

According to an embodiment, $\alpha$, $\beta$, and $\gamma$ may satisfy $0<\alpha+\beta+\gamma\leq0.02$. For example, $\alpha$, $\beta$, and $\gamma$ may satisfy $0<\alpha+\beta+\gamma\leq0.016$. When $\alpha+\beta+\gamma$ satisfies the above range, the structural stability of the lithium transition metal oxide is guaranteed. When $\alpha+\beta+\gamma$ is more than 0.02, an impurity phase is formed, which not only may act as a resistance during lithium desorption, but also may cause collapse of the crystal structure during repeated charging.

According to an embodiment, in Formula 1, $\beta$ and $\gamma$ may satisfy $0<\beta\leq0.003$ and $0<\gamma\leq0.003$, respectively.

For example, in Formula 1, $\beta=\gamma$ may be satisfied. In the case of $\beta=\gamma$ (for example, when molar ratios of Mg and Ti are equal to each other), charge is balanced in the lithium transition metal oxide during charging and discharging to suppress the collapse of the crystal structure, thereby improving structural stability, and as a result, improving lifetime characteristics.

According to an embodiment, a may satisfy $0<a\leq0.01$. For example, a may satisfy $0<a\leq0.005$, $0<a\leq0.003$, or $0<a\leq0.001$. Here, a refers to a substitution molar ratio of S to O element in the lithium transition metal oxide represented by Formula 1.

As a part of the oxygen element is substituted with S, the bonding force with the transition metal increases, and thus the transition of the crystal structure of the lithium transition metal oxide is suppressed, and as a result, the structural stability of the lithium transition metal oxide is improved.

Meanwhile, when the substitution molar ratio of S is more than 0.01, the crystal structure of the lithium transition metal oxide becomes unstable due to the repulsive force of S anions, and rather the lifetime characteristics thereof deteriorate.

According to an embodiment, the lithium transition metal oxide may be a single particle. A single particle is a concept that is differentiated from a secondary particle formed by agglomeration of a plurality of particles or a particle formed by agglomeration of a plurality of particles and coating the periphery of the agglomerate. Since the lithium transition metal oxide has a single particle shape, it is possible to prevent the particle from being broken even at a high electrode density. Accordingly, it is possible to realize a high energy density of a cathode active material including the lithium transition metal oxide. In addition, as compared with the secondary particle in which a plurality of single particles are agglomerated, it is possible to realize high energy density by suppressing breakage, and it is also possible to prevent lifetime deterioration due to breakage of the particle.

According to an embodiment, the lithium transition metal oxide may have a single crystal. A single crystal has a concept that is distinct from a single particle. The single particle refers to a particle formed of one particle regardless of the type and number of crystals therein, and the single crystal refer to having only one crystal in a particle. The single crystal lithium transition metal oxide has not only very high structural stability, but also has better lithium ion conduction than polycrystals, and thus has excellent high-speed charging characteristics compared to a polycrystalline active material.

According to an embodiment, the cathode active material is formed as a single crystal and a single particle. Since the cathode active material is formed as a single crystal and a single particle, a structurally stable and high-density electrode may be implemented, and a lithium secondary battery including the same may have both improved lifespan characteristics and high energy density.

According to an embodiment, the lithium transition metal oxide may be represented by Formula 3 or 4:

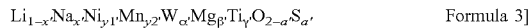
$$Li_{1-x'}Na_{x'}Ni_{y1'}Mn_{y2'}W_{\alpha'}Mg_{\beta'}Ti_{\gamma'}O_{2-a'}S_{a'}$$ [Formula 3]

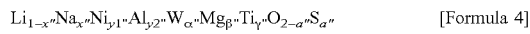
$$Li_{1-x''}Na_{x''}Ni_{y1''}Al_{y2''}W_{\alpha''}Mg_{\beta''}Ti_{\gamma''}O_{2-a''}S_{a''}$$ [Formula 4]

wherein, in Formula 3,
$0<x'\leq0.01$, $0<\alpha'\leq0.01$, $0<\beta'\leq0.005$, $0<\gamma'\leq0.005$, $0<a'\leq0.01$, $0<\alpha'+\beta'+\gamma'\leq0.02$, $0.68\leq y1'<1$, $0<y2'\leq0.3$, and $y1'+y2'+\alpha'+\beta'+\gamma'=1$, and in Formula 4,
$0<x''\leq0.01$, $0<\alpha''\leq0.01$, $0<\beta''\leq0.005$, $0<\gamma''\leq0.005$, $0<a''\leq0.01$, $0<\alpha''+\beta''+\gamma''\leq0.02$, $0.78\leq y1''<1$, $0<y2''\leq0.2$, and $y1''+y2''+\alpha''+\beta''+\gamma''=1$.

For example, in Formula 3, $0<\beta'\leq0.003$, $0<\gamma'\leq0.003$, and $0<\alpha'+\beta'+\gamma'\leq0.016$ may be satisfied, and in Formula 4, $0<\beta''\leq0.003$, $0<\gamma''\leq0.003$, and $0<\alpha''+\beta''+\gamma''\leq0.016$ may be satisfied.

For example, in Formula 3, $0.78\leq y1'<1$, $0<y2'\leq0.2$, and $0<a'\leq0.001$ may be satisfied.

For example, in Formula 4, $0.88\leq y1''<1$, $0<y2''\leq0.1$, and $0<a''\leq0.001$ may be satisfied.

In the lithium transition metal oxide satisfying the above composition, unstable Ni ions therein may be stabilized, and high energy density and long lifetime stability may be maintained.

In the case of a general cobalt-free high-nickel anode active material, stabilization of unstable Ni ions is essential. In this case, since W, Mg, and Ti are introduced into some of transition metal sites in the crystal, the cathode active material may achieve an overall charge balance, thereby inhibiting the oxidation from Ni(II) ions to unstable Ni(III) or Ni(IV) ions and reducing unstable Ni(III) or Ni(IV) to Ni(II). Meanwhile, the loss of conductivity due to substitution of some of the transition metals with heterogeneous elements W, Mg and Ti was compensated for by substitution of a part of O with S, and a decrease in conductivity of Li due to structural deformation during charge and discharge was also suppressed by substituting a part of Li with Na, thereby obtaining a high-capacity and long-lifetime cathode active material having a structurally stable single crystal.

According to an embodiment, the average particle diameter ($D_{50}$) of the lithium transition metal oxide may be 0.1 μm to 20 μm. For example, the average particle diameter (($D_{50}$) thereof may be 0.1 μm to 15 μm, 0.1 μm to 10 μm, 1 μm to 20 μm, 5 μm to 20 μm, 1 μm to 15 μm, 1 μm to 10 μm, 5 μm to 15 μm, or 5 μm to 10 μm. When the average particle diameter of the lithium transition metal oxide is within the above range, a desired energy density per volume can be realized. When the average particle diameter of the lithium transition metal oxide is more than 20 μm, a sharp drop in charging and discharging capacity occurs, and when it is less than 0.1 μm, it is difficult to obtain a desired energy density per volume.

According to an embodiment, the lithium transition metal oxide may have a layered structure.

According to another embodiment, the lithium transition metal oxide may have a layered rock salt type structure including a layered structure and a rock salt structure.

In the case of a lithium nickel-based transition metal oxide, phase transition can easily occur from a layered structure to a rock salt structure by an electrochemical reaction. In particular, in the case of a cobalt-free cathode active material having poor structural stability, a phase transition can occur more easily. Since the rock salt structure is irreversible, it causes a decrease in capacity. Accordingly, the suppression of conversion from a layered structure to a rock salt structure by a electrochemical reaction is preferable in terms of capacity and long lifetime characteristics.

According to an embodiment, in the lithium transition metal oxide, a ratio ($I_a/I_b$) of a peak value ($I_a$) in a (003) plane and a peak value in a (104) plane in an X-ray diffraction spectrum obtained by XRD analysis using CuKα radiation after an electrochemical reaction is 1.0 or more. Generally, when the ratio ($I_a/I_b$) is 1.0 or more, for example, about 1.1, it is determined that the lithium transition metal oxide has a layered structure. In this case, the lithium transition metal oxide according to an embodiment of the present disclosure can maintain a layered structure even after an electrochemical reaction.

Hereinafter, a method of preparing a cathode active material according to an aspect will be described in detail.

The method of preparing a cathode active material according to an aspect includes: preparing a precursor compound in which a part of Li is substituted with Na, and which includes a transition metal (M) other than a Co element, at least includes one element of W, Mg and Ti, and further includes an S element; and heat-treating the precursor compound to obtain a cathode active material.

According to an embodiment, the preparing of the precursor compound may include: mixing an M element compound among a Li element-containing compound, a Na element-containing compound, a W element-containing compound, a Mg element-containing compound and a Ti-element-containing compound with a S element-containing compound.

Contents of the cathode active material have been described above.

The mixing includes mechanically mixing the specific element-containing compounds. The mechanical mixing is performed by a drying method. The mechanical mixing is to form a uniform mixture by pulverizing and mixing materials to be mixed by applying a mechanical force. The mechanical mixing may be performed using a mixing device such as ball mill, planetary mill, stirred ball mill, or vibrating mill, which uses chemically inert beads. In this case, in order to maximize a mixing effect, alcohol such as ethanol and higher fatty acid such as stearic acid may be selectively added in a small amount.

The mechanical mixing is performed in an oxidation atmosphere, which is for implementing structural stability of the active material by preventing the reduction of the transition metal in the transition metal source (for example, a Ni compound).

The lithium element-containing compound may include, but is not limited to, lithium hydroxide, lithium oxide, lithium nitride, lithium carbonate, or a combination thereof. For example, the lithium precursor may be LiOH or $Li_2CO_3$.

The Na element-containing compound may include, but is not limited to, Na hydroxide, Na oxide, Na nitride, Na carbonate, or a combination thereof. For example, the Na element-containing compound may be NaOH, $Na_2CO_3$, or a combination thereof.

The W element-containing compound may include, but is not limited to, W hydroxide, W oxide, W nitride, W carbonate, or a combination thereof. For example, the W element-containing compound may be $W(OH)_6$, $WO_3$, or a combination thereof.

The Mg element-containing compound may include, but is not limited to, Mg hydroxide, Mg oxide, Mg nitride, Mg carbonate, or a combination thereof. For example, the Mg element-containing compound may be $Mg(OH)_2$, $MgCO_3$, or a combination thereof.

The Ti element-containing compound may include, but is not limited to, Ti hydroxide, Ti oxide, Ti nitride, Ti carbonate, or a combination thereof. For example, the Ti element-containing compound may be $Ti(OH)_2$, $TiO_2$, or a combination thereof.

The M element-containing compound may include, but is not limited to, hydroxide, oxide, nitride, or carbonate of at least one element selected from group 3 to 12 elements in the periodic table, except for Co, W, Mg, and Ti, or a combination thereof. For example, the M element-containing compound may be $Ni_{0.8}Mn_{0.1}(OH)_2$ or $Ni_{0.95}Al_{0.05}(OH)_2$.

The S element-containing compound may include, but is not limited to, S hydroxide, S oxide, S nitride, S carbonate, or a combination thereof. For example, the S element-containing compound may be $(NH_4)_2S$.

The heat-treating of the precursor compound may include first heat treatment and second heat treatment. The first heat treatment and the second heat treatment may be performed continuously or a rest period may be set after the first heat treatment. Further, the first heat treatment and the second heat treatment may be performed in the same chamber or may be performed in different chambers from each other.

Heat treatment temperature in the first heat treatment may be higher than heat treatment temperature in the second heat treatment.

The first heat treatment may be performed at a heat treatment temperature of 800° C. to 1200° C. The heat treatment temperature may be, but is not limited to, 850° C. to 1200° C., 860° C. to 1200° C., 870° C. to 1200° C., 880° C. to 1200° C., 890° C. to 1200° C., or 900° C. to 1200° C., and includes all ranges configured by selecting any two points within the above range.

The second heat treatment may be performed at a heat treatment temperature of 650° C. to 850° C. The heat treatment temperature may be, but is not limited to, 680° C. to 830° C., 690° C. to 820° C., 700° C. to 810° C., 650° C. to 800° C., 650° C. to 780° C., 650° C. to 760° C., 650° C. to 740° C., 650° C. to 720° C., or 680° C. to 720° C., and includes all ranges configured by selecting any two points within the above range.

According to an embodiment, heat treatment time in the first heat treatment may be shorter than heat treatment time in the second heat treatment.

For example, the heat treatment time in the first heat treatment may be, but is not limited to, 3 hours to 10 hours, 4 hours to 9 hours, or 5 hours to 8 hours, and includes all ranges configured by selecting any two points within the above range.

For example, the heat treatment time in the second heat treatment may be, but is not limited to, 15 hours to 25 hours or 18 hours to 23 hours, and includes all ranges configured by selecting any two points within the above range.

The first heat treatment may include heat treatment for 3 hours to 10 hours at a heat treatment temperature of 800° C. to 1200° C.

The second heat treatment may include heat treatment for 15 hours to 23 hours at a heat treatment temperature of 650° C. to 850° C.

In the first heat treatment, the precursor compound may form a cathode active material having a layered structure and simultaneously induce growth of particles, thereby forming a single crystal shape. In the first heat treatment, it is presumed that as primary particles in the secondary particle-shaped lithium transition metal oxide rapidly grow and cannot withstand interparticle stress, the inside of the primary particles are exposed and thus the primary particles are fused to each other, thereby forming a single crystal cathode active material for a secondary battery. In the second heat treatment, the crystallinity of the layered structure formed in the first heat treatment is increased by performing heat treatment at a temperature lower than that in the first heat treatment for a long time. Through the first and second heat treatment processes, a single phase, single crystal, single particle high-nickel cobalt-free (Co-free) cathode active material may be obtained.

According to an embodiment, the lithium transition metal oxide prepared by the above preparation method is a single crystal and a single particle, and the single crystal may have a layered structure. The average particle diameter of the lithium transition metal oxide may be 0.1 µm to 20 µm.

In the cobalt-free lithium transition metal oxide prepared by the method of preparing the cathode active material, W, Mg and Ti elements are substituted at the sites of M element in the structure, S element is substituted at the site of O, and Na element is substituted at the site of Li, thereby not only inhibiting the oxidation of $Ni^{2+}$ but also causing the reduction of unstable $Ni^{3+}$ ions to $Ni^{2+}$ ions to obtain a lithium transition metal oxide having structural stability and high density. Further, reduced $Ni^{2+}$ ions and $Li^+$ ions have similar ionic radii to each other, so that Li/Ni disordering is promoted, and void lattice is filled with Ni ions during Li desorption, thereby improving the structural stability of the crystal.

According to another aspect, there is provided a cathode including the above-described cathode active material.

According to another aspect, there is provided a lithium secondary battery including the cathode, an anode, and an electrolyte.

The cathode and the lithium secondary battery including the same may be manufactured as follows.

First, a cathode is prepared.

For example, a cathode active material composition in which the above-described cathode active material, a conductive material, a binder, and a solvent are mixed is prepared. A cathode plate is prepared by coating a metal current collector with the cathode active material composition. Alternatively, the cathode plate may be prepared by casting the cathode active material composition onto a separate support, separating a film from the support and then laminating the separated film on a metal current collector. The cathode is not limited to the above-described form, but may have a form other than the above-described form.

Examples of the conductive material may include, but are not limited to, graphite such as natural graphite and artificial graphite; carbon black; conductive tubes such as carbon nanotubes; conductive whiskers of fluorocarbon, zinc oxide, and potassium titanate; and conductive metal oxides such as titanium oxide. Any conductive material may be used as long as it may be used in the art.

Examples of the binder may include, but are not limited to, a vinylidene fluoride/hexafluoropropylene copolymer, polyvinylidene fluoride (PVDF), polyacrylonitrile, polymethylmethacrylate, polytetrafluoroethylene and mixtures thereof, and a styrene butadiene rubber-based polymer. Any binder may be used as long as it may be used in the art. As another example of the binder, the lithium salt, sodium salt, calcium salt, or Na salt of the above-described polymer may be used.

As the solvent, N-methylpyrrolidone, acetone, water, or the like may be used, but the present disclosure is not limited thereto. Any solvent may be used as long as it is used in the related technical field.

The content of the cathode active material, the content of the conductive material, the content of the binder, and the content of the solvent are levels commonly used in the lithium secondary battery. Depending on the use and configuration of a lithium battery, one or more of the above conductive material, binder, and solvent may be omitted.

Next, an anode is prepared.

For example, an anode active material composition in which an anode active material, a conductive material, a binder, and a solvent are mixed is prepared. An anode plate is prepared by directly coating a metal current collector having a thickness of 3 µm to 500 µm with the anode active material composition and drying the anode active material composition. Alternatively, the anode plate may be prepared by casting the anode active material composition onto a separate support, separating a film from the support and then laminating the separated film on a metal current collector.

The anode current collector is not particularly limited as long as it has conductivity without causing chemical changes in the battery. For example, an anode current collector in which copper, nickel, or copper is surface-treated with carbon may be used.

The anode active material may be used without limitation. Any anode active material may be used as long as it may be used in the art. For example, the anode active material may include at least one selected from a lithium metal, a metal alloyable with lithium, a transition metal oxide, a non-transition metal oxide, and a carbon-based material.

For example, the metal alloyable with lithium may be Si, Sn, Al, Ge, Pb, Bi, Sb, a Si—Y alloy (Y is an alkaline metal, an alkaline earth metal, a group 13 element, a group 14 element, a transition metal, or a combination thereof, not Si), or a Sn—Y alloy (Y is an alkaline metal, an alkaline earth metal, a group 13 element, a group 14 element, a transition metal, or a combination thereof, not Sn). The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, or Te.

For example, the transition metal oxide may be lithium titanium oxide, vanadium oxide, lithium vanadium oxide, or the like.

For example, the non-transition metal oxide may be $SnO_2$, $SiO_x$ (0<x<2), or the like.

The carbon-based material may be crystalline carbon, amorphous carbon, or a mixture thereof. The crystalline carbon may be graphite such as natural graphite or artificial graphite of an amorphous, plate-like, flake-like, spherical or fibrous form. The amorphous carbon may be soft carbon (low-temperature fired carbon), hard carbon, mesophase pitch carbide, or fired coke.

The conductive material, binder and solvent in the anode active material composition may be the same as those in the cathode active material composition.

The content of the anode active material, the content of the conductive material, the content of the binder, and the content of the solvent are levels commonly used in the lithium secondary battery. Depending on the use and configuration of a lithium battery, one or more of the above conductive material, binder, and solvent may be omitted.

Next, a separator to be inserted between the anode and the cathode is prepared.

As the separator, any separator may be used as long as it is commonly used in a lithium battery. A separator having low resistance to the movement of ions in the electrolyte and superior in electrolyte wettability may be used. The separator may be a single film or a multilayer film. For example, the separator may include any one selected from glass fiber, polyester, Teflon, polyethylene, polypropylene, polytetrafluoroethylene (PTFE), and combinations thereof, and may be made in the form of nonwoven fabric or woven fabric. Further, a mixed multilayer film such as a polyethylene/polypropylene two-layer separator, a polyethylene/polypropylene/polyethylene three-layer separator, or a polypropylene/polyethylene/polypropylene three-layer separator may be used. For example, a windable separator including polyethylene, polypropylene, or the like may be used in a lithium ion battery, and a separator having good electrolyte impregnation ability may be used in a lithium ion polymer battery. For example, the separator may be manufactured by the following method.

A polymer resin, a filler, and a solvent are mixed to prepare a separator composition. The separator composition is directly applied on an electrode and dried to form a separator. Alternatively, the separator composition is cast on a support and dried, a separation film is separated from the support, and then the separation film is laminated on the electrode to form a separator.

The polymer resin used in the manufacture of the separator is not limited, and any material may be used as long as it may be used in a binder of an electrode plate. For example, as the polymer resin, a vinylidene fluoride/hexafluoropropylene copolymer, polyvinylidene fluoride (PVDF), polyacrylonitrile, polymethyl methacrylate, or a mixture thereof may be used.

Next, an electrolyte is prepared.

For example, the electrolyte may be an organic electrolyte. The electrolyte may be a solid electrolyte. For example, the solid electrolyte may be boron oxide, lithium oxynitride, or the like, but is not limited thereto. Any solid electrolyte may be used as long as it may be used in the art. The solid electrolyte may be formed on the cathode by sputtering or the like.

For example, the organic electrolyte may be prepared by dissolving lithium salt in an organic solvent.

As the organic solvent, any organic solvent may be used as long as it may be used in the art. Examples of the organic solvent may include cyclic carbonates such as propylene carbonate, ethylene carbonate, fluoroethylene carbonate, butylene carbonate, and vinylene carbonate; chain carbonates such as dimethyl carbonate, diethyl carbonate, methyl ethyl carbonate, methyl propyl carbonate, ethyl propyl carbonate, methyl isopropyl carbonate, dipropyl carbonate, and dibutyl carbonate; esters such as methyl acetate, ethyl acetate, propyl acetate, methyl propionate, ethyl propionate, and γ-butyrolactone; ethers such as 1,2-dimethoxyethane, 1,2-diethoxyethane, tetrahydrofuran, 1,2-dioxane, and 2-methyltetrahydrofuran; nitriles such as acetonitrile; and amides such as dimethylformamide. They may be alone or in combination of two or more. For example, a solvent in which a cyclic carbonate and a chain carbonate are mixed may be used.

In addition, a gel polymer electrolyte in which a polymer electrolyte such as polyethylene oxide or polyacrylonitrile is impregnated with an electrolyte, or an inorganic solid electrolyte such as LiI, $Li_3N$, $Li_xGe_yP_zS_\alpha$, $Li_xGe_yP_zS_\alpha X_\delta$ (X=F, Cl, Br) may be used.

As the lithium salt, any lithium salt may be used as long as it may be used in the art. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (here, x and y are natural number), LiCl, LiI, or a mixture thereof.

Figure 9:
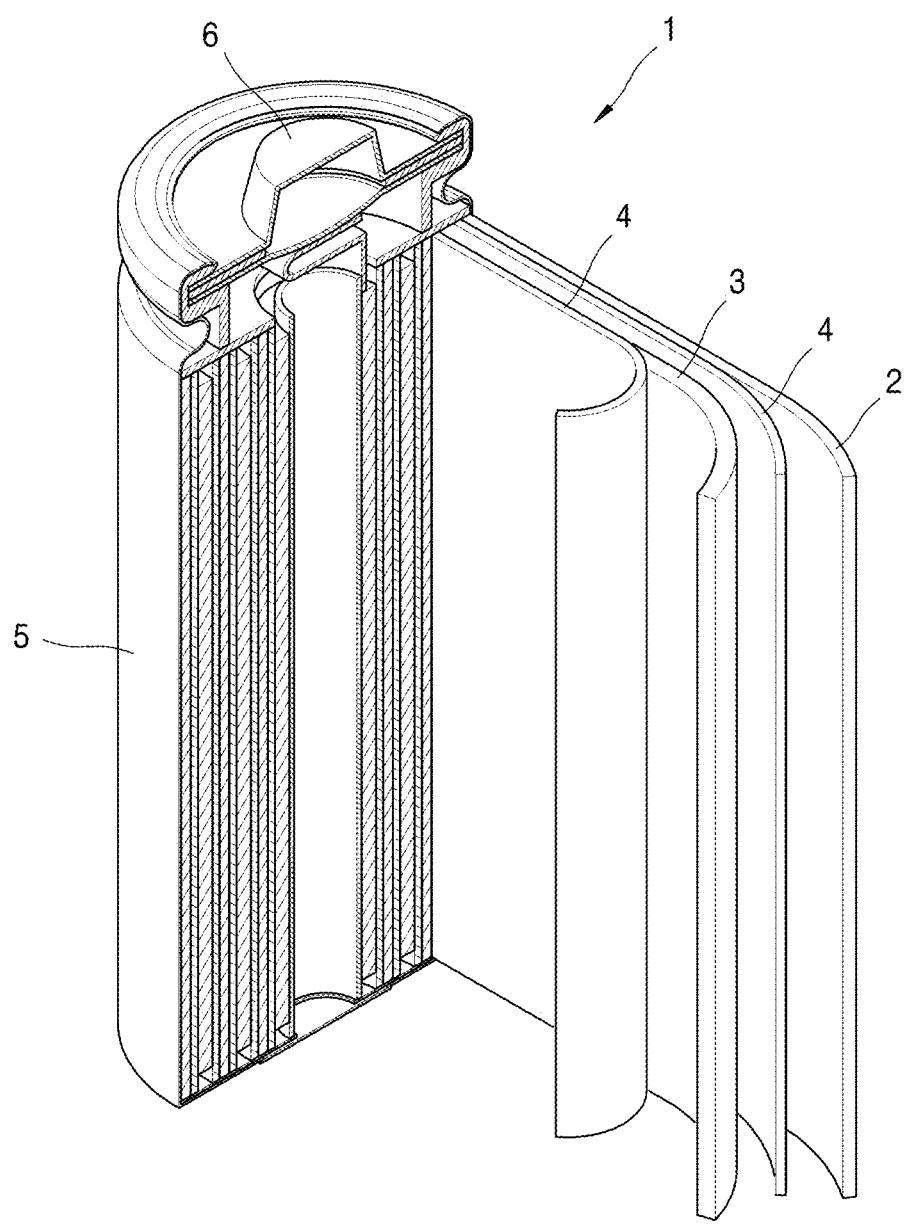
FIG. 9 is a schematic view of a lithium secondary battery according to an embodiment.

As shown in FIG. 9, the lithium secondary battery 1 includes a cathode 3, an anode 2, and a separator 4. The anode 3, the cathode 2, and the separator 4 are wound or folded and accommodated in a battery case 5. Then, an organic electrolyte is injected into the battery case 5, and the battery case 5 is sealed with a cap assembly 6 to complete the manufacture of the lithium secondary battery 1. The battery case 5 may have a cylindrical shape, a rectangular shape, a pouch shape, a coin shape, or a thin film shape. For example, the lithium secondary battery 1 may be a thin-film battery. The lithium secondary battery 1 may be a lithium ion battery.

The separator may be located between the anode and the cathode to form a battery structure. The battery structure is laminated as a bi-cell structure and then impregnated with an electrolyte, and the resulting product is accommodated in a pouch and sealed to complete a lithium ion polymer battery.

Further, the plurality of battery structures are laminated to form a battery pack, and this battery pack may be used in all appliances requiring high capacity and high power. For example, the battery pack may be used in notebooks, smart phones, electric vehicles, and the like.

Further, since the lithium secondary battery is excellent in lifetime characteristics and high rate characteristics, it may be used in electric vehicles (EV). For example, the lithium secondary battery may be used in hybrid vehicles such as plug-in hybrid electric vehicles Further, the lithium secondary battery may be used in fields requiring a large amount of electric power storage. For example, the lithium secondary battery may be used in electric bicycles, electric tools, power storage systems, and the like.

Hereinafter, the present disclosure will be described in more detail with reference to Examples and Comparative Examples. However, these Examples are for illustrating the present disclosure, and the scope of the present disclosure is not limited thereto.

(Preparation of Cathode Active Material)

Example 1

100 g of $Ni_{0.8}Mn_{0.2}(OH)_2$, 41.8 g of $Li_2CO_3$, 3.0 g of $WO_3$, 0.27 g of $MgCO_3$, 0.24 g of $TiO_2$, 0.45 g of NaOH, and 0.75 g of $(NH_4)_2S$ were mechanically mixed for about 15 minutes to obtained mixed powder. The mixed powder was heat-treated at 920° C. for 8 hours and at 700° C. for 20 hours to obtain a cathode active material. The specific composition of the obtained cathode active material may be shown in Table 1.

Example 2

100 g of $Ni_{0.95}Al_{0.05}(OH)_2$, 42.4 g of $Li_2CO_3$, 3.0 g of $WO_3$, 0.27 g of $MgCO_3$, 0.24 g of $TiO_2$, 0.45 g of NaOH, and 0.75 g of $(NH_4)_2S$ were mechanically mixed for about 15 minutes to obtained mixed powder. The mixed powder was heat-treated at 880° C. for 4 hours and at 700° C. for 20 hours to obtain a cathode active material. The specific composition of the obtained cathode active material may be shown in Table 1.

Comparative Example 1

100 g of $Ni_{0.8}Mn_{0.2}(OH)_2$ and 41.8 g of $Li_2CO_3$ were mechanically mixed for about 15 minutes to obtained mixed powder. The mixed powder was heat-treated at 920° C. for 8 hours and at 700° C. for 20 hours to obtain a cathode active material. The specific composition of the obtained cathode active material may be shown in Table 1.

Comparative Example 2

100 g of $Ni_{0.8}Mn_{0.2}(OH)_2$, 41.8 g of $Li_2CO_3$, and 0.45 g of NaOH were mechanically mixed for about 15 minutes to obtained mixed powder. The mixed powder was heat-treated at 920° C. for 8 hours and at 700° C. for 20 hours to obtain a cathode active material. The specific composition of the obtained cathode active material may be shown in Table 1.

Comparative Example 3

100 g of $Ni_{0.8}Mn_{0.2}(OH)_2$, 41.8 g of $Li_2CO_3$, 3.0 g of $WO_3$, and 0.24 g of $TiO_2$ were mechanically mixed for about 15 minutes to obtained mixed powder. The mixed powder was heat-treated at 920° C. for 8 hours and at 700° C. for 20 hours to obtain a cathode active material. The specific composition of the obtained cathode active material may be shown in Table 1.

Comparative Example 4

100 g of $Ni_{0.8}Mn_{0.2}(OH)_2$, 41.8 g of $Li_2CO_3$, 3.0 g of $WO_3$, 0.27 g of $MgCO_3$, 0.24 g of $TiO_2$, 0.45 g of NaOH, and 0.2 g of $NH_4F$ were mechanically mixed for about 15 minutes to obtained mixed powder. The mixed powder was heat-treated at 920° C. for 8 hours and at 700° C. for 20 hours to obtain a cathode active material. The specific composition of the obtained cathode active material may be shown in Table 1.

Comparative Example 5

100 g of $Ni_{0.95}Al_{0.05}(OH)_2$ and 42.4 g of $Li_2CO_3$ were mechanically mixed for about 15 minutes to obtained mixed powder. The mixed powder was heat-treated at 880° C. for 4 hours and at 700° C. for 20 hours to obtain a cathode active material. The specific composition of the obtained cathode active material may be shown in Table 1.

Comparative Example 6

100 g of $Ni_{0.95}Al_{0.05}(OH)_2$, 41.8 g of $Li_2CO_3$, and 0.45 g of NaOH were mechanically mixed for about 15 minutes to obtained mixed powder. The mixed powder was heat-treated at 880° C. for 4 hours and at 700° C. for 20 hours to obtain a cathode active material. The specific composition of the obtained cathode active material may be shown in Table 1.

Comparative Example 7

100 g of $Ni_{0.95}Al_{0.05}(OH)_2$, 41.8 g of $Li_2CO_3$, 3.0 g of $WO_3$, and 0.24 g of $TiO_2$ were mechanically mixed for about 15 minutes to obtained mixed powder. The mixed powder was heat-treated at 880° C. for 4 hours and at 700° C. for 20 hours to obtain a cathode active material. The specific composition of the obtained cathode active material may be shown in Table 1.

Comparative Example 8

100 g of $Ni_{0.95}Al_{0.05}(OH)_2$, 41.8 g of $Li_2CO_3$, 3.0 g of $WO_3$, 0.27 g of $MgCO_3$, 0.24 g of $TiO_2$, 0.45 g of NaOH, and 0.2 g of NH$_4$F were mechanically mixed for about 15 minutes to obtained mixed powder. The mixed powder was heat-treated at 880° C. for 4 hours and at 700° C. for 20 hours to obtain a cathode active material. The specific composition of the obtained cathode active material may be shown in Table 1.

(Manufacture of Half Cell)

Example 3

The cathode active material obtained in Example 1, a conductive material, and a binder were mixed at a weight ratio of 94:3:3 to prepare slurry. Here, as the conductive material, carbon black was used, and as the binder, polyvinylidene fluoride (PVdF) was dissolved in an N-methyl-2-pyrrolidone solvent and used.

The slurry was uniformly applied onto an Al current collector and dried at 110° C. for 2 hours to prepare a cathode. The loading level of an electrode plate was 11.0 mg/cm$^2$, and the electrode density thereof was 3.6 g/cc.

The prepared cathode was used as a working electrode, lithium foil was used as a counter electrode, and a liquid electrode in which LiPF$_6$, as a lithium salt, is added to a mixed solvent in which EC/EMC/DEC are mixed at a volume ratio of 3/4/3 such that the concentration of LiPF$_6$ is 1.3 M, was used to manufacture a half cell CR2032 through a generally known process.

Example 4

A half cell was manufactured in the same manner as in Example 3, except that the cathode active material obtained in Example 2 was used instead of the cathode active material obtained in Example 1.

Comparative Examples 9 to 16

Half cells were manufactured in the same manner as in Example 3, except that the cathode active materials obtained in Comparative Examples 1 to 8 was respectively used instead of the cathode active material obtained in Example 1.

TABLE 1

| Cathode active material/half cell | Composition of cathode active material |
|---|---|
| Example 1/Example 3 | Li$_{0.99}$Na$_{0.01}$W$_{0.01}$Mg$_{0.003}$Ti$_{0.003}$Ni$_{0.788}$Mn$_{0.96}$O$_{1.999}$S$_{0.001}$ |
| Example 2/Example 4 | Li$_{0.99}$Na$_{0.01}$W$_{0.01}$Mg$_{0.003}$Ti$_{0.003}$Ni$_{0.933}$Al$_{0.051}$O$_{1.999}$S$_{0.001}$ |
| Comparative Example 1/Comparative Example 9 | LiNi$_{0.8}$Mn$_{0.2}$O$_2$ |
| Comparative Example 2/Comparative Example 10 | Li$_{0.99}$Na$_{0.01}$Ni$_{0.8}$Mn$_{0.2}$O$_2$ |
| Comparative Example 3/Comparative Example 11 | LiW$_{0.01}$Ti$_{0.003}$Ni$_{0.791}$Mn$_{0.196}$O$_2$ |
| Comparative Example 4/Comparative Example 12 | Li$_{0.99}$Na$_{0.01}$W$_{0.01}$Mg$_{0.003}$Ti$_{0.003}$Ni$_{0.787}$Mn$_{0.197}$O$_{1.999}$F$_{0.001}$ |
| Comparative Example 5/Comparative Example 13 | LiNi$_{0.95}$Al$_{0.05}$O$_2$ |
| Comparative Example 6/Comparative Example 14 | Li$_{0.99}$Na$_{0.01}$Ni$_{0.95}$Al$_{0.05}$O$_2$ |
| Comparative Example 7/Comparative Example 15 | LiW$_{0.01}$Ti$_{0.003}$Ni$_{0.941}$Al$_{0.046}$O$_2$ |
| Comparative Example 8/Comparative Example 16 | Li$_{0.99}$Na$_{0.01}$W$_{0.01}$Mg$_{0.003}$Ti$_{0.003}$Ni$_{0.937}$Al$_{0.047}$O$_{1.999}$F$_{0.001}$ |

Evaluation Example 1

Evaluation of Composition of Cathode Active Material

For the cathode active materials synthesized in Example 1 and Comparative Example 1, and Example 2 and Comparative Example 5, inductively coupled plasma (ICP) analysis was performed using a 700-ES (Varian) equipment, and the results are shown in Tables 2 and 3 below.

Referring to Tables 2 and 3, ICP results of in Example 1 and Comparative Example 1, and Example 2 and Comparative Example 5, in the case of the cathode active materials of Examples 1 and 2, it may be found that 0.01 mol of Na is substituted at a Li site, and it may be found that 0.01 mol of W, 0.003 mol of Mg, and 0.003 mol of Ti are substituted at a transition metal site. Since S does not affect the number of moles of transition metal or Li, it is thought that a part of O is substituted with S. In ICP analysis, even when the analysis is performed in a vacuum, it is difficult to analyze the stoichiometric value of oxygen contained in the material due to the influx of oxygen and carbon dioxide in the atmosphere in a trace amount.

TABLE 2

| (mol %) | Li | Na | Ni | Mn | W | Mg | Ti | S |
|---|---|---|---|---|---|---|---|---|
| Comparative Example 1 | 100 | — | 79.7 | 20.3 | — | — | — | — |
| Example 1 | 99 | 1 | 78.8 | 19.6 | 1 | 0.3 | 0.3 | 0.1 |

TABLE 3

| (mol %) | Li | Na | Ni | Al | W | Mg | Ti | S |
|---|---|---|---|---|---|---|---|---|
| Comparative Example 5 | 100 | — | 94.7 | 5.3 | — | — | — | — |
| Example 2 | 99 | 1 | 93.3 | 5.1 | 1 | 0.3 | 0.3 | 0.1 |

Evaluation Example 2

Evaluation of Particle Size of Cathode Active Material

Figure 1B:
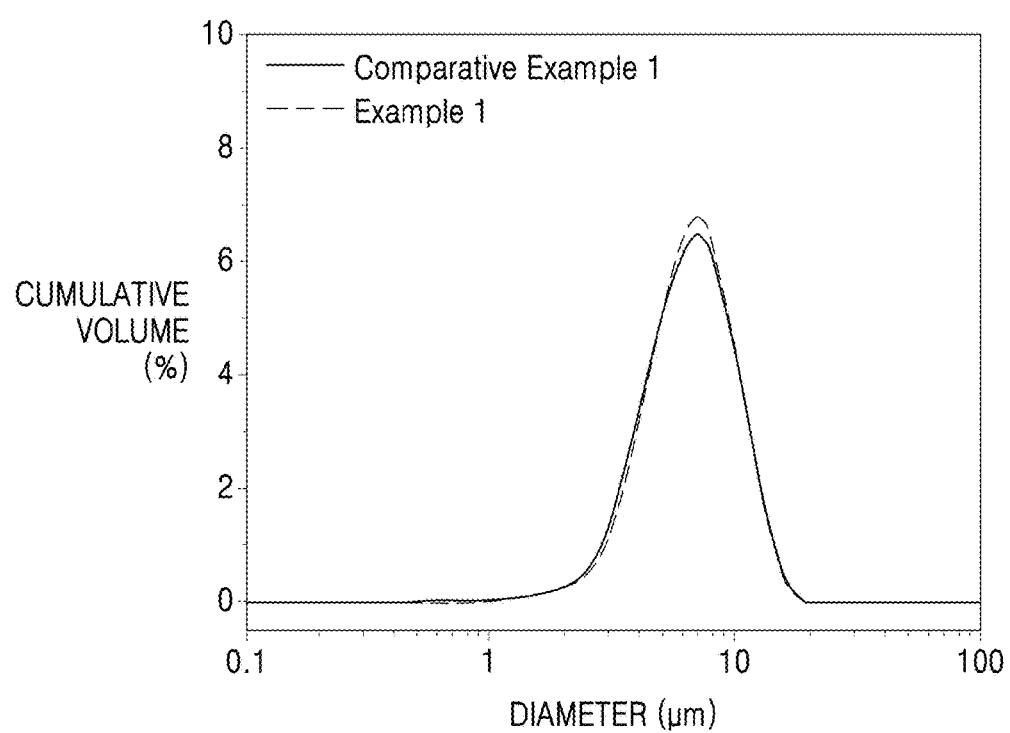
FIG. 1B is a graph illustrating the particle size distributions of the cathode active materials of Example 1 and Comparative Example 1.
Figure 2A:
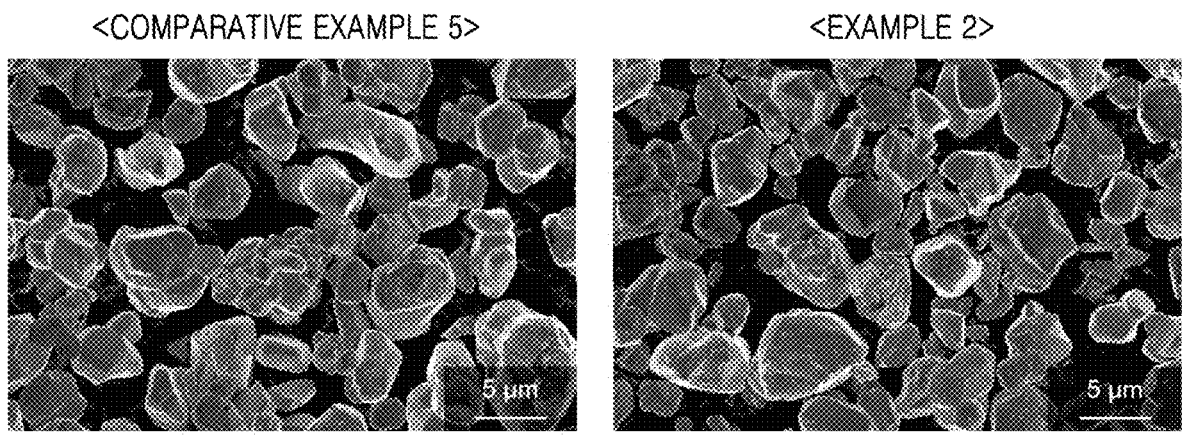
FIG. 2A is an SEM photograph of the cathode active materials of Example 2 and Comparative Example 5.

The SEM images of appearances of the cathode active materials synthesized in Example 1 and Comparative Example 1, and Example 2 and Comparative Example 5 were obtained by using Verios 460 (FEI Corporation) equipment, respectively, and shown in FIGS. 1A and 2A. In addition, the particle size distributions thereof were measured using Cilas 1090 (Scinco Corporation) equipment, and are shown in Table 4, FIG. 1B, Table 5, and FIG. 2B.

Referring to Table 4 and FIGS. 1A and 1B, the single-particle-type cathode active material of Example 1 was not observed to have a large change in particle diameter as compared with the single-particle-type cathode active material of Comparative Example 1. This suggests that additional elements are introduced into the lithium transition metal oxide particle and replaces some elements.

Figure 2B:
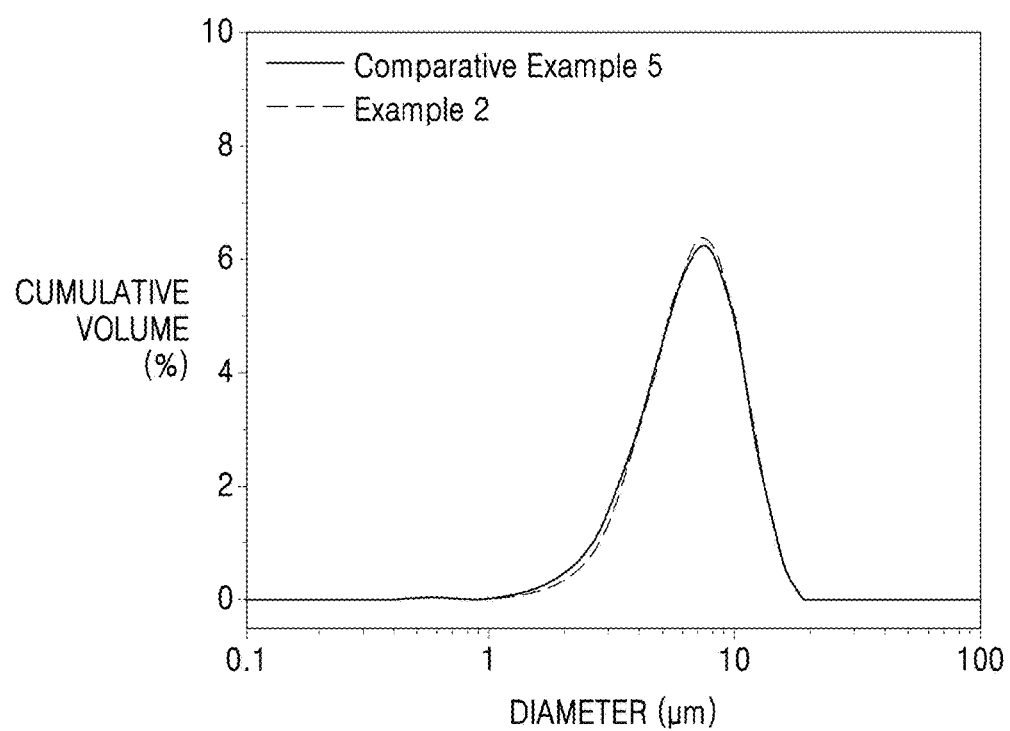
FIG. 2B is a graph illustrating the particle size distributions of the cathode active materials of Example 2 and Comparative Example 5.

Referring to Table 5 and FIGS. 2A and 2B, as mentioned in Example 1 above, even in Example 2, the introduction of additional elements did not change the particle diameter. Thus, this suggests that additional elements are introduced into the lithium transition metal oxide particle and replaces some elements.

TABLE 4

|  | $D_{10}(\mu m)$ | $D_{50}(\mu m)$ | $D_{90}(\mu m)$ |
|---|---|---|---|
| Comparative Example 1 | 3.4 | 6.3 | 10.5 |
| Example 1 | 3.6 | 6.4 | 10.5 |

TABLE 5

|  | $D_{10}(\mu m)$ | $D_{50}(\mu m)$ | $D_{90}(\mu m)$ |
|---|---|---|---|
| Comparative Example 5 | 3.3 | 6.5 | 10.9 |
| Example 2 | 3.6 | 6.4 | 10.5 |

Evaluation Example 3

Evaluation of Room-Temperature Lifetime

The half cells manufactured in Examples 3 to 4 and Comparative Examples 9 to 16 were left for 10 hours, and then charged in CC mode to 4.3V at 0.1 C, and then charged in CV mode to a current corresponding to 0.05 C. Then, the half cells were charged in CC mode to 3.0V at 0.1 C to complete a formation process.

Then, the half cells were charged in CC mode to 4.3V at 0.5 C at room temperature (25° C.), and then charged in CV mode to a current corresponding to 0.05 C. Then, the half cells were charged in CC mode to 3.0V at 1 C, and these processes were repeated a total of 100 times.

For the initial capacity, the capacity retention rates after 100 charging and discharging were calculated, and the results are shown in Table 6 below. In addition, graphs showing the capacity retention rates according to cycles are shown in FIGS. 3 to 6.

TABLE 6

| Cathode active material/ half cell | Composition of cathode active material | Lifetime retention rate after 100 cycles (%) |
|---|---|---|
| Example 1/ Example 3 | $Li_{0.99}Na_{0.01}W_{0.01}Mg_{0.003}Ti_{0.003}Ni_{0.788}Mn_{0.96}O_{1.999}S_{0.001}$ | 85.8 |
| Example 2/ Example 4 | $Li_{0.99}Na_{0.01}W_{0.01}Mg_{0.003}Ti_{0.003}Ni_{0.933}Al_{0.051}O_{1.999}S_{0.001}$ | 81.5 |
| Comparative Example 1/ Comparative Example 9 | $LiNi_{0.8}Mn_{0.2}O_2$ | 70.9 |
| Comparative Example 2/ Comparative Example 10 | $Li_{0.99}Na_{0.01}Ni_{0.8}Mn_{0.2}O_2$ | 76.1 |
| Comparative Example 3/ Comparative Example 11 | $LiW_{0.01}Ti_{0.003}Ni_{0.791}Mn_{0.196}O_2$ | 74.8 |
| Comparative Example 4/ Comparative Example 12 | $Li_{0.99}Na_{0.01}W_{0.01}Mg_{0.003}Ti_{0.003}Ni_{0.787}Mn_{0.197}O_{1.999}F_{0.001}$ | 79.6 |
| Comparative Example 5/ Comparative Example 13 | $LiNi_{0.95}Al_{0.05}O_2$ | 58.1 |
| Comparative Example 6/ Comparative Example 14 | $Li_{0.99}Na_{0.01}Ni_{0.95}Al_{0.05}O_2$ | 63.6 |
| Comparative Example 7/ Comparative Example 15 | $LiW_{0.01}Ti_{0.003}Ni_{0.941}Al_{0.046}O_2$ | 76.7 |
| Comparative Example 8/ Comparative Example 16 | $Li_{0.99}Na_{0.01}W_{0.01}Mg_{0.003}Ti_{0.003}Ni_{0.937}Al_{0.047}O_{1.999}F_{0.001}$ | 79.8 |

Figure 3:
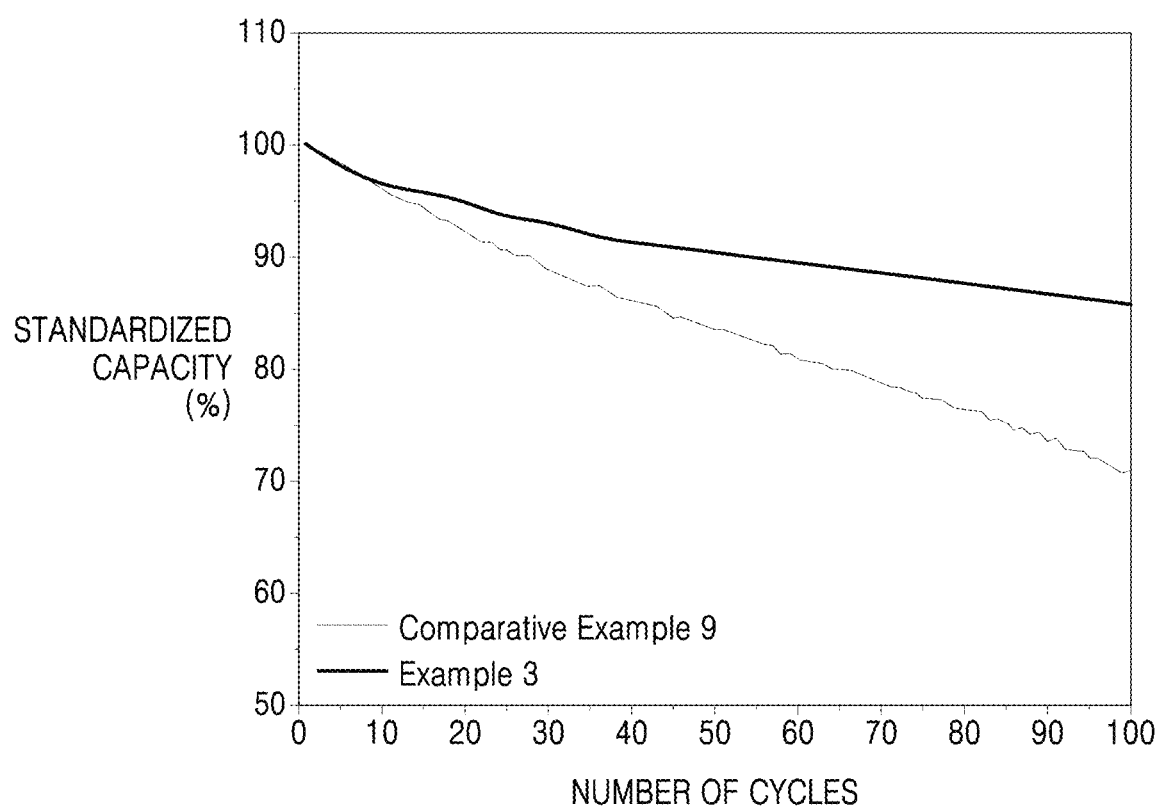
FIG. 3 is a graph illustrating the lifetime retention rates of the half cells of Example 3 and Comparative Example 9.
Figure 4:
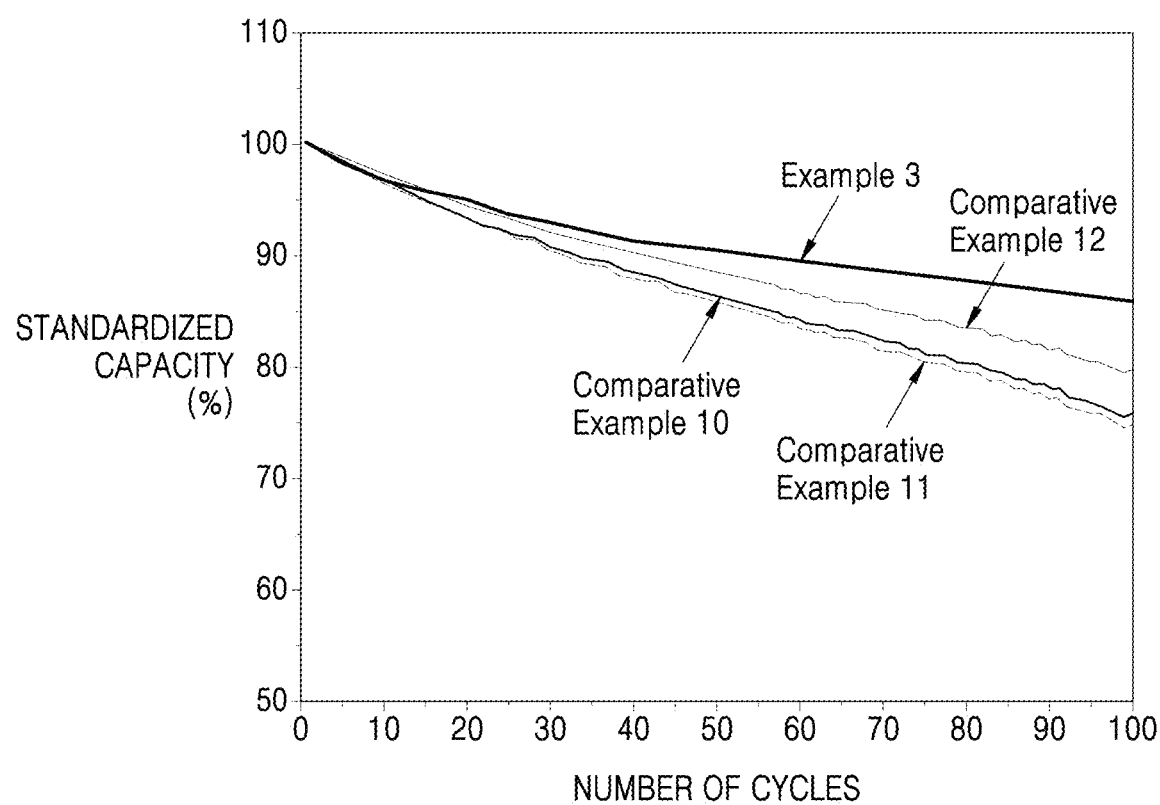
FIG. 4 is a graph illustrating the lifetime retention rates of the half cells of Example 3 and Comparative Examples 10 to 12.

Referring to Table 6 and FIGS. 3 and 4, according to the room-temperature lifetime results of Example 3 and Comparative Example 9, in the case of Example 3 in which the cathode active material further containing Na, W, Mg, Ti, and S elements was applied, a high lifetime retention rate of about 15% was exhibited at 100 cycles. In this case, despite the fact that the cathode active material used in Example 3 does not contain Co, the introduction of Na element to the lithium site in the structure inhibits the spontaneous reduction of nickel ions and inhibits the generation of electrochemically inactive phase. Moreover, the introduction of W, Mg and Ti elements in the structure increases the ordering of Ni ions in the structure to improve structural stability, and in electrochemical evaluation, the bonding strength between transition metal oxide and oxygen increases to inhibit the release of oxygen in the structure, thereby inhibiting side reactions with an electrolyte. Moreover, the S element substituted at the oxygen site has high electronegativity as compared with oxygen, thereby increasing the bonding strength between the transition metal and oxygen and improving the conductivity of the active material. Accordingly, the introduction of five additional elements not only provides structural stability of the cathode active material, but also improves the conductivity of the active material, thereby improving the electrochemical lifetime stability. In Example 3, lifetime characteristics were improved by up to about 11% at 100 cycles as compared with Comparative Example 10 in which Na element was introduced, Comparative Example 11 in which Ti element was introduced, and Comparative Example 12 in which Na, W, Mg, Ti, and F elements were introduced. This suggests that a synergistic effect occurs when Na and S are introduced and at least one of W, Mg, and Ti is introduced.

Figure 5:
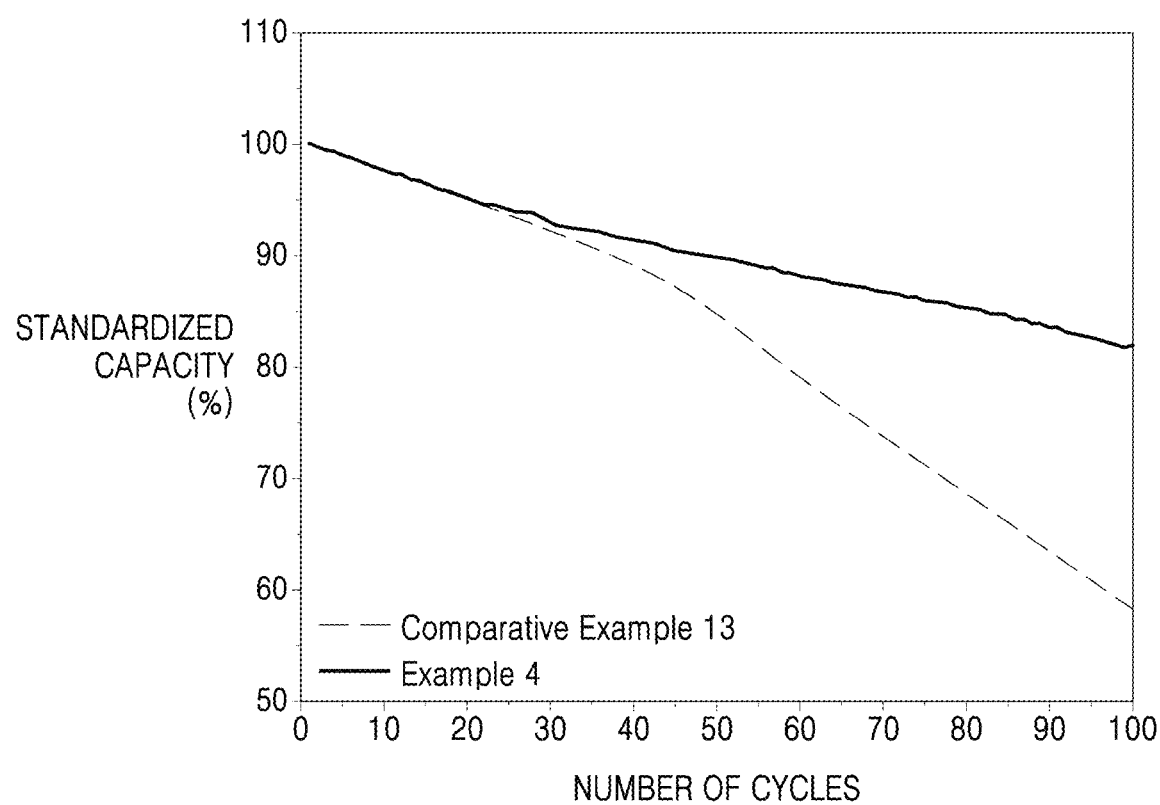
FIG. 5 is a graph illustrating the lifetime retention rates of the half cells of Example 4 and Comparative Example 13.
Figure 6:
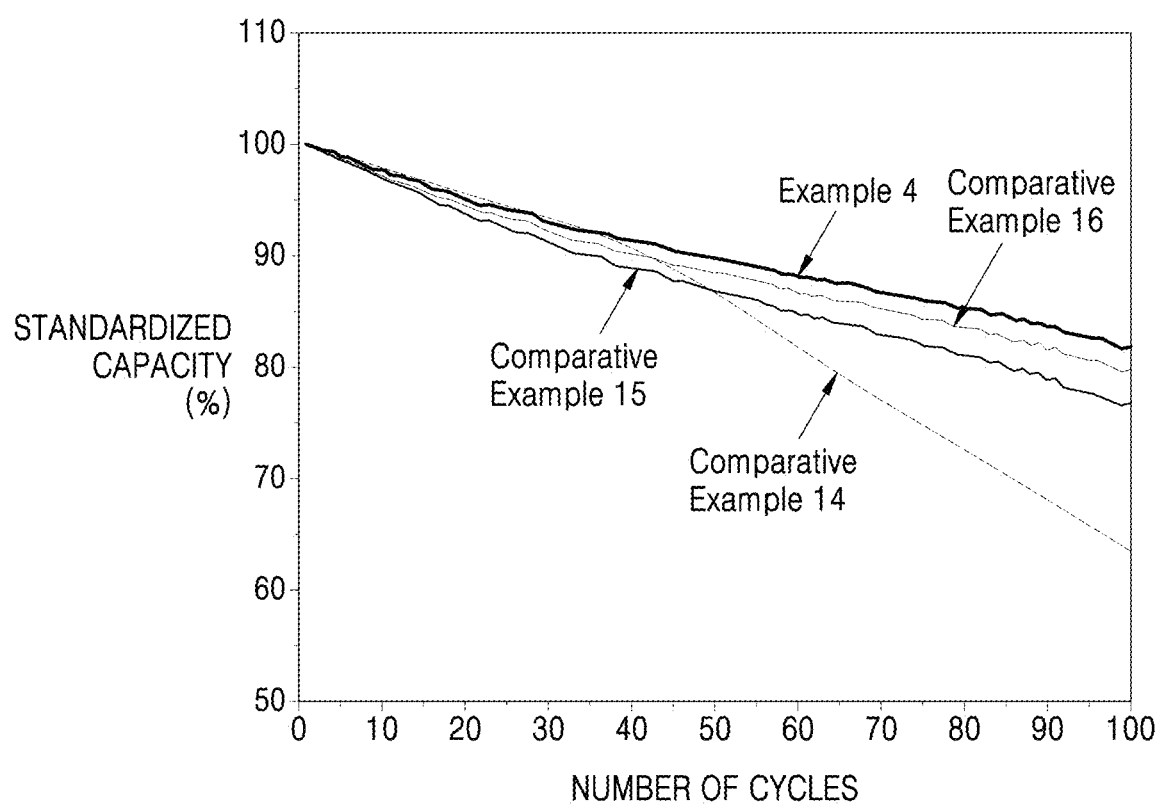
FIG. 6 is a graph illustrating the lifetime retention rates of the half cells of Example 4 and Comparative Examples 14 to 16.

Referring to Table 6 and FIGS. 5 and 6, even in Example 4 in which a nickel-aluminum positive electrode active material is used, as Na, W, Mg, Ti, S were introduced into the cathode active material, lifetime characteristics were improved by about 23% as compared with Comparative Example 13 in which such elements are not included. In Example 4, lifetime characteristics were improved by up to about 18% at 100 cycles as compared with Comparative Example 14 in which Na element was introduced, Comparative Example 15 in which Ti element was introduced, and Comparative Example 16 in which Na, W, Mg, Ti, and F elements were introduced.

Evaluation Example 4

Evaluation of Room-Temperature Lifetime

After the half cells of Example 3 and Comparative Example 9 were discharged 100 times, an anode active material was collected from an anode, and XRD measurement was performed. In order to confirm a phase change in crystals, XRD measurement was also performed on the cathode active materials of Example 1 and Comparative Example 1 (before charging and discharging).

Figure 7:
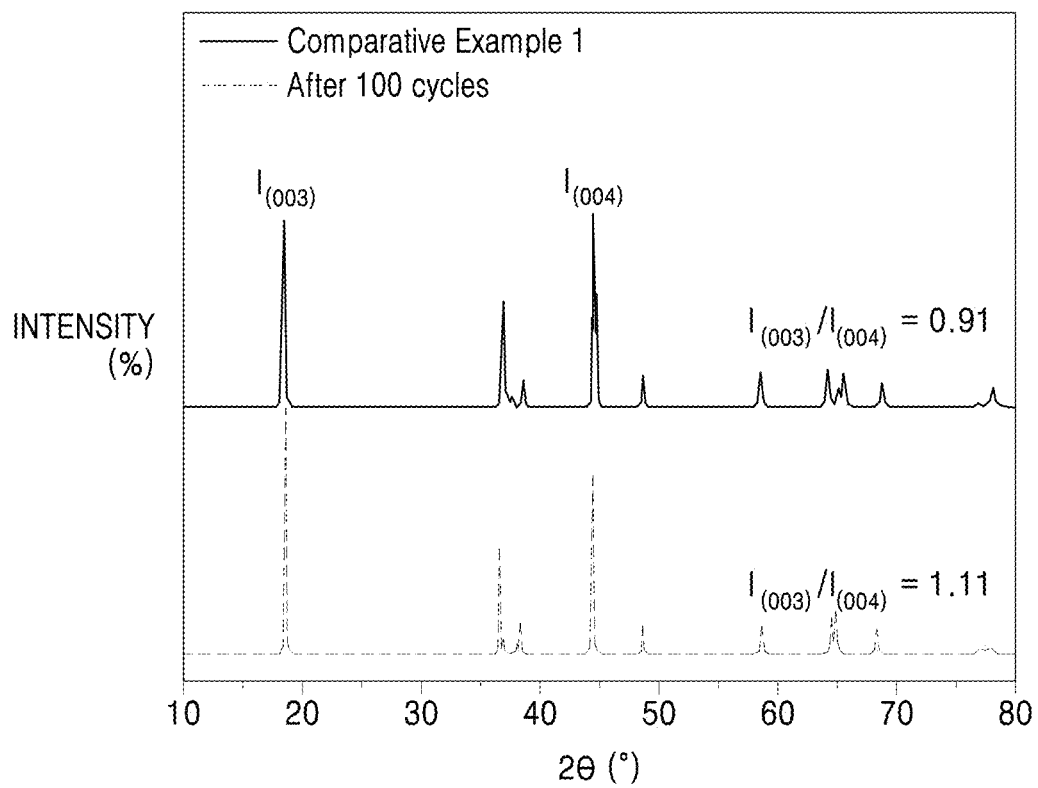
FIG. 7 illustrates XRD graphs of the cathode active material of Comparative Example 1 and an anode active material after 100 cycles of charging and discharging of the half cell of Comparative Example 9.
Figure 8:
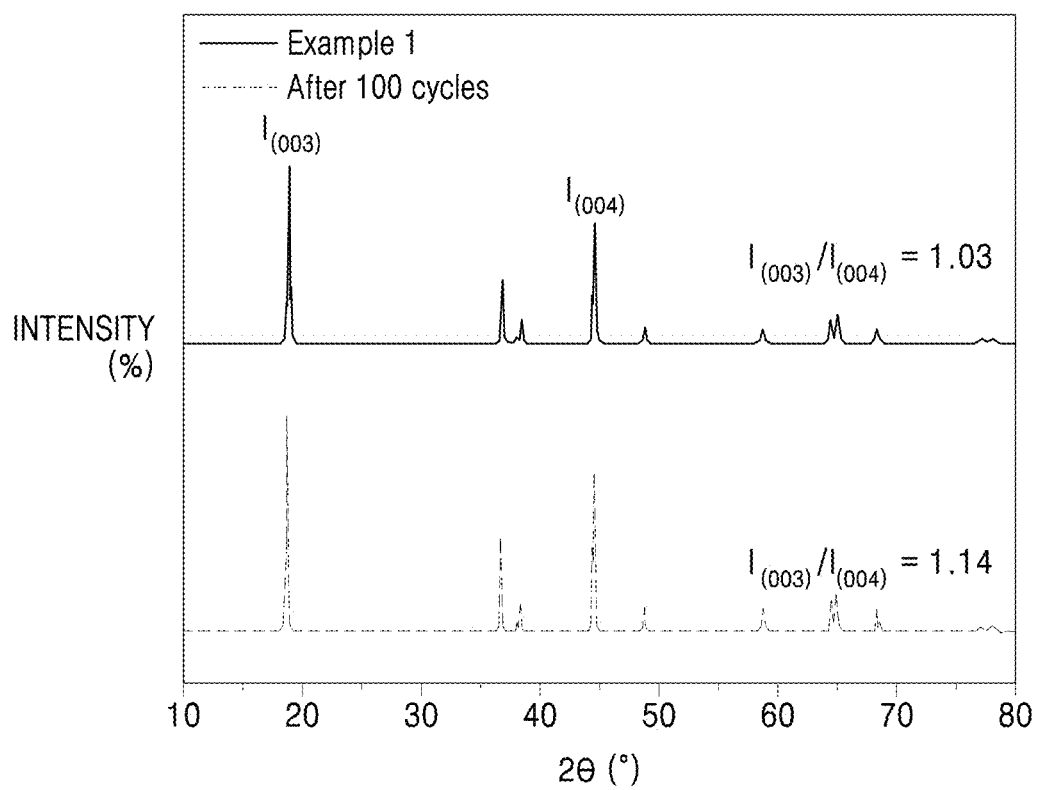
FIG. 8 illustrates XRD graphs of the cathode active material of Example 1 and an anode active material after 100 cycles of charging and discharging of the half cell of Example 3.

The results thereof are shown in FIGS. 7 and 8.

Referring to FIGS. 7 and 8, in the XRD graph, $I_{(003)}$ is a diffraction intensity value for c-axis indicating a layered structure, and $I_{(104)}$ is a diffraction intensity value for a rock-salt structure which is an electrochemically inactive phase. Accordingly, the larger the ratio of $I_{(003)}/I_{(104)}$, the less the phase transition occurred from the layered structure to the rock-salt structure. In the case of Comparative Example 1, the $I_{(003)}/I_{(104)}$ ratio was decreased from 1.11 to 0.91 (Comparative Example 9) after 100 cycles. This suggests that the rock-salt structure exists as a main phase in the crystal. In contrast, in the case of Examples 1 and 3, it may be found that the ratio of $I_{(003)}/I_{(104)}$ is maintained at about 1.1 after 100 cycles. This suggests that the layered structure of the cathode active material of Example 1 is maintained without phase transition even after 100 cycles. Accordingly, it is suggested that the introduction of five electrochemically stable elements (Na, W, Mg, Ti, and S) into the Co-free single crystal/single particle Ni-based cathode active material of Example 1 can improve the structural stability of the crystal.

Heretofore, preferred embodiments according to the present disclosure have been described with reference to the drawings and embodiments, but this is only illustrative, and it will be understood that various modifications and other equivalent embodiments are possible from those of ordinary skill in the art. Therefore, the scope of protection of the present disclosure should be defined by the appended claims.

The invention claimed is:

1. A cathode active material comprising:
   a lithium transition metal oxide represented by Formula 1, as follows:

wherein, in Formula 1,
   M comprises Ni and at least one element selected from elements of Groups 3 to 12 of the periodic table, other than Co, W, Mg and Ti;
   M' comprises W, Mg and Ti;
   M and M' do not contain Co element; and
   $0<x\leq0.01$, $0<y<1$, $0<z<<1$, and $0<t\leq0.01$.

2. The cathode active material of claim 1, wherein y and z satisfy $0<z(y+z)\leq0.02$.

3. The cathode active material of claim 1, wherein the lithium transition metal oxide is a single particle.

4. The cathode active material of claim 1, wherein the lithium transition metal oxide is a single crystal.

5. The cathode active material of claim 1, wherein, the lithium transition metal oxide has a layered structure.

6. The cathode active material of claim 1, wherein, in the lithium transition metal oxide, a ratio $(l_a/l_b)$ of a peak value $(l_a)$ in a (003) plane and a peak value in a (104) plane in an X-ray diffraction spectrum obtained by XRD analysis using CuKα radiation after an electrochemical reaction is 1.0 or more.

7. The cathode active material of claim 1, wherein the lithium transition metal oxide has an average particle diameter ($D_{50}$) of about 0.1 μm to about 20 μm.

8. A lithium secondary battery comprising:
   a cathode comprising the cathode active material of claim 1;
   an anode; and
   an electrolyte.

9. A lithium secondary battery comprising:
   a cathode comprising the cathode active material of claim 2;
   an anode; and
   an electrolyte.

10. A lithium secondary battery comprising:
    a cathode comprising the cathode active material of claim 3;
    an anode; and
    an electrolyte.

11. A lithium secondary battery comprising:
a cathode comprising the cathode active material of claim 4;
an anode; and
an electrolyte.

* * * * *